US012611738B2

(12) United States Patent     (10) Patent No.:   US 12,611,738 B2

Maniwa et al.     (45) Date of Patent:    Apr. 28, 2026

(54) FLUX-CORED WIRE

(71) Applicant: Kobe Steel, Ltd., Kobe (JP)

(72) Inventors: Hirofumi Maniwa, Fujisawa (JP);
Yoshihiko Kitagawa, Fujisawa (JP);
Masamichi Suzuki, Fujisawa (JP)

(73) Assignee: Kobe Steel, Ltd., Kobe (JP)

( * ) Notice: Subject to any disclaimer, the term of this
patent is extended or adjusted under 35
U.S.C. 154(b) by 609 days.

(21) Appl. No.: 18/251,661

(22) PCT Filed: Nov. 19, 2021

(86) PCT No.: PCT/JP2021/042699
§ 371 (c)(1),
(2) Date: May 3, 2023

(87) PCT Pub. No.: WO2022/130905
PCT Pub. Date: Jun. 23, 2022

(65) Prior Publication Data
US 2024/0009779 A1    Jan. 11, 2024

(30) Foreign Application Priority Data
Dec. 18, 2020   (JP) ................................. 2020-210799

(51) Int. Cl.
B23K 35/368      (2006.01)
(52) U.S. Cl.
CPC .................................. B23K 35/368 (2013.01)
(58) Field of Classification Search
None
See application file for complete search history.

(56) References Cited

U.S. PATENT DOCUMENTS 4,122,238 A  *  10/1978   Frantzerb, Sr. ...... B23K 35/368
                                           219/146.1
5,781,846 A  *  7/1998   Jossick .............. B23K 35/0227
                                           428/560

(Continued)

FOREIGN PATENT DOCUMENTS

JP          2019-887 A      1/2019
JP          6719217 B2     7/2020

OTHER PUBLICATIONS

International Search Report issued Feb. 1, 2022 in PCT/JP2021/
042699 filed on Nov. 19, 2021 therein 2 pages.

(Continued)

*Primary Examiner* — Thor S Campbell
(74) *Attorney, Agent, or Firm* — Oblon, McClelland,
Maier & Neustadt, L.L.P.

(57)          ABSTRACT

A flux cored wire which exhibits excellent welding work-
ability during gas-shielded arc welding, while enabling the
achievement of a welded metal that has excellent tensile
strength and toughness at low temperatures. The wire is
obtained by filling a sheath with a flux and is adequately
controlled with respect to the corresponding chemical com-
ponents, while having a θ of from 10.0 to 30.0 as calculated
by the mathematical formula (I): $\theta=4.1\times\alpha-3.2\times\gamma-32.3$. The
respective contents, in mass %, of Si, Cr, Mo, Ti, C, N, Mn,
Cu and Ni, relative to the total mass of the wire, are
respectively represented by [Si], [Cr], [Mo], [Ti], [C], [N],
[Mn], [Cu] and [Ni], $\alpha=0.02\times[Si]+[Cr]+1.20\times[Mo]+0.3\times$
[Ti]+0.30 and $\gamma=24\times[C]+28\times[N]+0.25\times[Mn]+0.5/[Cu]+$
$1.10\times[Ni]$.

2 Claims, 1 Drawing Sheet

(56)         References Cited

U.S. PATENT DOCUMENTS

| 12,383,990 | B2 * | 8/2025 | Han | C22C 38/50 |
|---|---|---|---|---|
| 2002/0060212 | A1 * | 5/2002 | Kim | B23K 35/3608 |
| | | | | 219/146.3 |
| 2009/0261085 | A1 * | 10/2009 | Suzuki | B23K 35/362 |
| | | | | 219/145.22 |
| 2011/0180523 | A1 * | 7/2011 | Ikeda | B23K 35/3607 |
| | | | | 219/145.22 |
| 2015/0114944 | A1 * | 4/2015 | Fukuda | B23K 35/406 |
| | | | | 219/145.22 |
| 2016/0207150 | A1 * | 7/2016 | Rikiya | B23K 35/362 |
| 2016/0214214 | A1 * | 7/2016 | Rikiya | B23K 35/3605 |
| 2016/0303690 | A1 * | 10/2016 | Kayamori | C22C 38/002 |
| 2017/0129056 | A1 * | 5/2017 | Takayama | C22C 38/04 |
| 2017/0144257 | A1 * | 5/2017 | Sasaki | B23K 35/38 |
| 2017/0274482 | A1 * | 9/2017 | Han | B23K 35/3073 |
| 2018/0056454 | A1 * | 3/2018 | Kayamori | B23K 35/3053 |
| 2018/0272477 | A1 * | 9/2018 | Sasaki | B23K 35/3605 |
| 2018/0326544 | A1 * | 11/2018 | Yamakami | C22C 38/48 |
| 2018/0339370 | A1 * | 11/2018 | Yamakami | B23K 35/30 |
| 2019/0030655 | A1 * | 1/2019 | Watanabe | C22C 38/12 |
| 2019/0126411 | A1 * | 5/2019 | Kawabe | C22C 38/48 |
| 2019/0210165 | A1 * | 7/2019 | Nako | C22C 38/04 |
| 2019/0217423 | A1 * | 7/2019 | Sakabayashi | B23K 9/173 |
| 2019/0329347 | A1 * | 10/2019 | Fujimoto | B23K 9/025 |
| 2020/0070273 | A1 * | 3/2020 | Watanabe | C22C 38/12 |
| 2020/0230733 | A1 * | 7/2020 | Mukai | C22C 38/50 |
| 2022/0355421 | A1 * | 11/2022 | Nako | C22C 38/001 |
| 2023/0271277 | A1 * | 8/2023 | Han | C22C 38/002 |
| | | | | 148/26 |
| 2024/0009776 | A1 * | 1/2024 | Nagami | C22C 38/16 |
| 2024/0009779 | A1 * | 1/2024 | Maniwa | B23K 35/3608 |
| 2024/0300056 | A1 * | 9/2024 | Isono | C22C 38/46 |
| 2025/0083264 | A1 * | 3/2025 | Matsuo | B23K 35/30 |
| 2025/0144750 | A1 * | 5/2025 | Belohlav | B23K 35/0244 |

OTHER PUBLICATIONS

Nisimoto, "Welding of Stainless Steels," Journal of the Japan Welding Society, vol. 66, No. 3, 1997, 20 pages (with partial English translation).

* cited by examiner

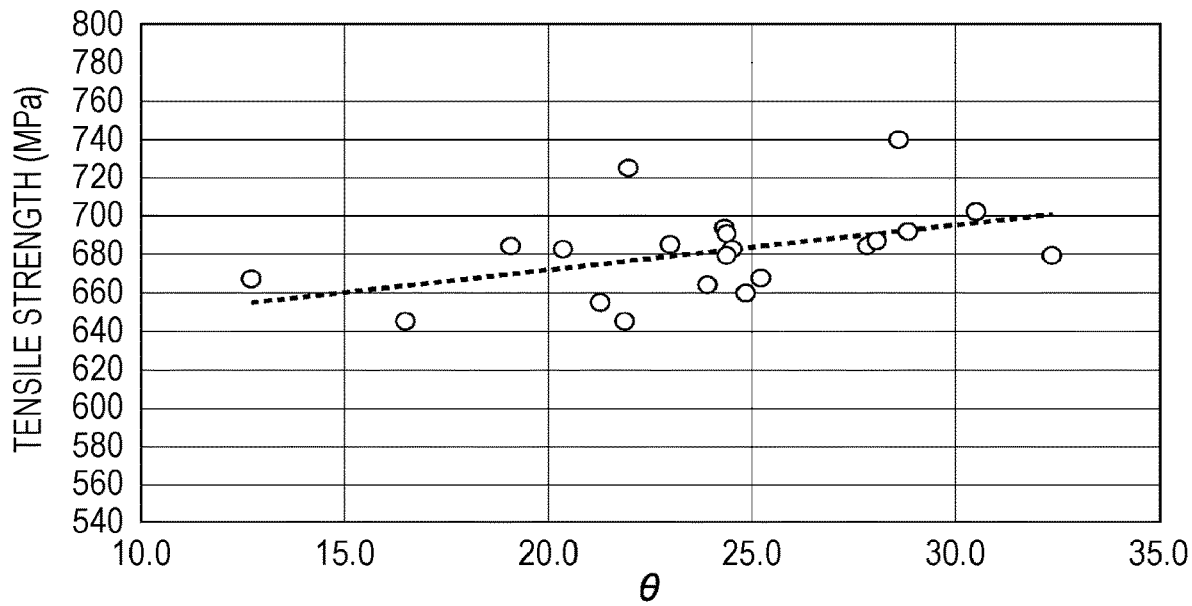

FLUX-CORED WIRE

CROSS REFERENCE TO RELATED APPLICATIONS

This application is a National Stage entry under 35 U.S.C. § 371 of PCT/JP2021/042699, filed on Nov. 19, 2021, and claims priority to Japanese Patent Application No. 2020-210799, filed on Dec. 18, 2020, the entire contents of which are incorporated herein by reference.

TECHNICAL FIELD

The present invention relates to a flux-cored wire.

BACKGROUND ART

Typically, gases are liquefied at low temperatures and stored in tanks in order to increase the efficiency of transportation and storage. Thus, structural members of storage tanks are required to have low-temperature toughness in liquefaction temperature ranges of gases to be stored.

5%-Ni steel plates having good tensile strength and low-temperature toughness are used as structural members for storage tanks for liquefied ethylene gas. Ni-based alloy welding materials are often used as welding materials for 5%-Ni steel plates. Stainless steel welding materials, which are less expensive than Ni-based alloys, are also used.

Patent Literature 1 discloses a stainless steel flux-cored wire for 5%-Ni steel plates. The flux-cored wire improves low-temperature toughness by adjusting the composition of the weld metal to achieve a fully austenitic microstructure.

CITATION LIST

Patent Literature

PTL 1: Japanese Patent No. 6719217

SUMMARY OF INVENTION

Technical Problem

Storage tanks for liquefied natural gas are required to have toughness properties in a lower temperature range than a temperature range in which tanks for liquefied ethylene gas are used. For this reason, 9%-Ni steel plates, which are superior in low-temperature toughness to 5%-Ni steel plates and have high strength, are used.

As with 5%-Ni steel plates, Ni-based alloy welding materials are typically used as welding materials for 9%-Ni steel plates. If stainless steel welding materials can be used, the cost can be reduced.

However, the stainless steel flux-cored wire described in Patent Literature 1 cannot be used for 9%-Ni steel plates because it may lack strength. To prevent the occurrence of hot cracking, desirably, the structure is not fully austenitic, but contains a certain amount of ferrite phase. Moreover, flux-cored wires are required to have good usability during arc welding.

The present invention has been made in view of the above-described circumstances, and it is an object of the present invention to provide a flux-cored wire that has good usability during gas-shielded arc welding and that can provide a weld metal excellent in tensile strength and low-temperature toughness.

Solution to Problem

The inventors have conducted intensive studies to solve the above problems and have found the following: The components in a flux-cored wire are specified to predetermined ranges to control the proportions of an austenite phase and a ferrite phase in a weld metal, so that the solidification form is an F mode, which is single-phase ferrite solidification, and fine Widmanstätten austenite is precipitated. This results in improvements in tensile strength and low-temperature toughness. These findings have led to the completion of the present invention.

The above object of the present invention is achieved by the following configuration [1] of a flux-cored wire.

[1] A flux-cored wire for gas-shielded arc welding includes a sheath filled with a flux and contains, based on the total mass of the wire:

Fe: 40% or more by mass and 70% or less by mass;
Cr: 15.0% or more by mass and 25.0% or less by mass;
Ni: 5.0% or more by mass and 11.0% or less by mass;
Si: 0.5% or more by mass and 3.0% or less by mass;
Mn: 0.5% or more by mass and 5.0% or less by mass;
Na and K in total: 0.05% or more by mass and 1.0% or less by mass;
$TiO_2$: 3.0% or more by mass and 9.0% or less by mass;
$ZrO_2$: more than 1.0% by mass and 4.0% or less by mass;
$Al_2O_3$: 0.3% or more by mass and 2.0% or less by mass;
C: less than 0.015% by mass;
Ti: 1.0% or less by mass;
Mo: 2.0% or less by mass;
Cu: 0.5% or less by mass;
Al: 0.9% or less by mass;
N: 0.040% or less by mass; and
F: 0.30% or less by mass,
in which θ calculated from the following mathematical expression is 10.0 or more and 30.0 or less, $$\theta = 4.1 \times \alpha - 3.2 \times \gamma - 32.3 \qquad (I)$$

where letting a Si content be [Si] in terms of percentage by mass based on the total mass of the wire, letting a Cr content be [Cr] in terms of percentage by mass based on the total mass of the wire, letting a Mo content be [Mo] in terms of percentage by mass based on the total mass of the wire, letting a Ti content be [Ti] in terms of percentage by mass based on the total mass of the wire, letting a C content be [C] in terms of percentage by mass based on the total mass of the wire, letting a N content be [N] in terms of percentage by mass based on the total mass of the wire, letting a Mn content be [Mn] in terms of percentage by mass based on the total mass of the wire, letting a Cu content be [Cu] in terms of percentage by mass based on the total mass of the wire, and letting a Ni content be [Ni] in terms of percentage by mass based on the total mass of the wire, $$\alpha = 0.02 \times [Si] + [Cr] + 1.20 \times [Mo] + 0.3 \times [Ti] + 0.30, \text{ and}$$

$$\gamma = 24 \times [C] + 28 \times [N] + 0.25 \times [Mn] + 0.5 \times [Cu] + 1.10 \times [Ni].$$

The flux-cored wire according to an aspect further contains, based on the total mass of the wire:
Bi: 0.001% or more by mass and 0.10% or less by mass.

Advantageous Effects of Invention

According to the present invention, it is possible to provide a flux-cored wire that has good usability during gas-shielded arc welding and that can provide a weld metal excellent in tensile strength and low-temperature toughness.

BRIEF DESCRIPTION OF DRAWINGS

FIG. 1 is a graph illustrating the relationship between the tensile strength and θ in inventive examples and comparative examples.

DESCRIPTION OF EMBODIMENTS

Embodiments of the present invention will be described in detail below. The present invention is not limited to the embodiments described below, but can be implemented with any modification to the extent that it does not depart from the gist of the invention.

[Flux-Cored Wire]

A flux-cored wire (hereinafter simply referred to as a "wire") includes a steel sheath filled with a flux.

In the present embodiment, the outside diameter of is preferably, but not necessarily, 0.9 mm or more and 1.6 mm or less, for example. The flux filling rate may be set to any value as long as the amount of each element contained in the wire is within the scope of the present invention. From the viewpoints of wire drawability during wire production and wire feedability, preferably, the flux filling rate is, for example, 10% or more by mass and 20% or less by mass based on the total mass of the wire. The sheath of the wire may be seamed or seamless, and the form of the seam and the cross-sectional shape thereof are not limited. The wire according to the present embodiment can be used for gas-shielded arc welding using, for example, 100% by volume of $CO_2$ gas as a shielding gas.

The reasons for adding components contained in the flux-cored wire for gas-shielded arc welding according to the present embodiment and the reasons for limiting the numerical values thereof will be described in detail below.

<Fe: 40% or More by Mass and 70% or Less by Mass>

Fe is the main component of the wire according to the present embodiment. The Fe content is 40% or more by mass, preferably 45% or more by mass, more preferably 50% or more by mass, based on the total mass of the wire. The Fe content is 70% or less by mass, preferably 67.5% or less by mass, more preferably 65% or less by mass, based on the total mass of the wire.

<Cr: 15.0% or More by Mass and 25.0% or Less by Mass>

Cr is an important component that determines the amount of ferrite in the weld metal, and is also an important element for the oxidation resistance of the weld metal, the stability of ferrite, and the suppression of embrittlement behavior due to thermal cycling.

A Cr content of less than 15.0% by mass based on the total mass of the wire is insufficient to produce a weld metal having a high ferrite microstructure content. Accordingly, the Cr content is 15.0% or more by mass, preferably 15.5% or more by mass, more preferably 16.0% or more by mass, based on the total mass of the wire.

At a Cr content of more than 25.0% by mass based on the total mass of the wire, the tendency of embrittlement due to multiple thermal cycles during welding is noticeable. Accordingly, the Cr content is 25.0% or less by mass, preferably 24.5% or less by mass, more preferably 24.0% or less by mass, based on the total mass of the wire.

<Ni: 5.0% or More by Mass and 11.0% or Less by Mass>

As with Cr, Ni is an important component that determines the amount of ferrite in the weld metal, and is also an important element for the oxidation resistance of the weld metal, the stability of austenite, and the suppression of embrittlement behavior due to thermal cycling.

A Ni content of less than 5.0% by mass based on the total mass of the wire is insufficient to produce a weld metal having a high austenite microstructure content. Accordingly, the Ni content is 5.0% or more by mass, preferably 5.5% or more by mass, more preferably 6.0% or more by mass, based on the total mass of the wire.

A Ni content of more than 11.0% by mass based on the total mass of the wire makes it difficult to ensure the amount of ferrite considered necessary in the present invention. Accordingly, the Ni content is 11.0% or less by mass, preferably 10.8% or less by mass, more preferably 10.6% or less by mass, based on the total mass of the wire.

<Si: 0.5% or More by Mass and 3.0% or Less by Mass>

Si is an important element as a deoxidizing agent of the weld metal and is a component effective in improving weld bead wetting.

A Si content of less than 0.5% by mass based on the total mass of the wire leads to insufficient deoxidization, thereby causing porosity defects, such as blowholes, and a decrease in the toughness of the weld metal. Accordingly, the Si content is 0.5% or more by mass, preferably 0.6% or more by mass, more preferably 0.8% or more by mass, based on the total mass of the wire.

Si is a ferrite-stabilizing element. However, the addition of an excessively large amount of Si to the wire decreases the toughness even at the same ferrite content. Accordingly, the Si content is 3.0% or less by mass, preferably 2.5% or less by mass, more preferably 2.0% or less by mass, based on the total mass of the wire.

In the present embodiment, the term "Si content" refers to the total Si content, the Si originating from elemental Si, Si compounds, and Si alloys contained in the wire.

<Mn: 0.5% or More by Mass and 5.0% or Less by Mass>

Mn is an important element as a deoxidizing agent for a weld metal.

A Mn content of less than 0.5% by mass based on the total mass of the wire leads to insufficient deoxidization, thereby causing porosity defects, such as blowholes, and a decrease in the toughness of the weld metal. Accordingly, the Mn content is 0.5% or more by mass, preferably 1.0% or more by mass, more preferably 1.5% or more by mass, based on the total mass of the wire.

A Mn content of more than 5.0% by mass based on the total mass of the wire may lead to the deterioration of slag removability. Accordingly, the Mn content is 5.0% or less by mass, preferably 4.0% or less by mass, more preferably 3.0% or less by mass, based on the total mass of the wire.

<Na and K in Total: 0.05% or More by Mass and 1.0% or Less by Mass>

Na and K are components effective in stabilizing an arc. The addition of appropriate amounts of thereof to the wire can obtain a good bead shape.

A total amount of Na and K of less than 0.05% by mass based on the total mass of the wire results in a failure to form a good bead shape. Accordingly, the total amount of Na and K is 0.05% or more by mass, preferably 0.10% or more by mass, more preferably 0.50% or more by mass, based on the total mass of the wire.

A total amount of Na and K of more than 1.0% by mass based on the total mass of the wire results in a deterioration in low-temperature toughness. Accordingly, the total amount of Na and K is 1.0% or less by mass, preferably 0.9% or less by mass, more preferably 0.8% or less by mass, based on the total mass of the wire.

Both Na and K may be contained in the wire, or only one of them may be contained in the wire, as long as the total amount thereof is 0.05% or more by mass and 1.0% or less by mass.

<$TiO_2$: 3.0% or More by Mass and 9.0% or Less by Mass>

$TiO_2$ is a component that is added to the wire as a slag forming agent effective in forming slag with good covering properties.

A $TiO_2$ content of less than 3.0% by mass based on the total mass of the wire results in a deterioration in the covering properties of the slag. Accordingly, the $TiO_2$ content is 3.0% or more by mass, preferably 5.0% or more by mass, more preferably 7.0% or more by mass, based on the total mass of the wire.

A $TiO_2$ content of more than 9.0% by mass based on the total mass of the wire results in the formation of an excessive amount of slag to easily cause slag inclusion in a weld zone. Accordingly, the $TiO_2$ content is 9.0% or less by mass, preferably 8.5% or less by mass, more preferably 8.0% or less by mass, based on the total mass of the wire.

In the present embodiment, the $TiO_2$ content is the Ti compound content in terms of $TiO_2$.

<$ZrO_2$: More than 1.0% by Mass and 4.0% or Less by Mass>

$ZrO_2$ is a high-melting-point oxide, a component that adjusts the viscosity and melting point of slag, and effective in increasing the solidification temperature of slag to improve the bead shape during welding.

A $ZrO_2$ content of 1.0% or less by mass based on the total mass of the wire results in a defective bead shape. Accordingly, the $ZrO_2$ content is more than 1.0% by mass, preferably 1.3% or more by mass, more preferably 1.6% or more by mass, based on the total mass of the wire.

A $ZrO_2$ content of more than 4.0% by mass based on the total mass of the wire may lead to an excessively high melting point of the molten slag to deteriorate the bead appearance and bead shape. Accordingly, the $ZrO_2$ content is 4.0% or less by mass, preferably 3.0% or less by mass, more preferably 2.0% or less by mass, based on the total mass of the wire.

In the present embodiment, the $ZrO_2$ content is defined as the total amount of Zr contained in elemental Zr, Zr alloys, and Zr compounds in terms of $ZrO_2$.

<$Al_2O_3$: 0.3% or More by Mass and 2.0% or Less by Mass>

$Al_2O_3$ is a component effective in increasing the viscosity of molten slag to modify the fluidity, thereby improving the bead appearance and the bead shape.

An $Al_2O_3$ content of less than 0.3% by mass based on the total mass of the wire results in a failure to satisfactorily retain the bead appearance and the bead shape and, in particular, results in a deterioration in usability in vertical welding. Accordingly, the $Al_2O_3$ content is 0.3% or more by mass, preferably 0.6% or more by mass, more preferably 0.9% or more by mass, based on the total mass of the wire.

An $Al_2O_3$ content of more than 2.0% by mass based on the total mass of the wire results in excessively high viscosity of the molten slag to cause a defective bead shape. Accordingly, the $Al_2O_3$ content is 2.0% or less by mass, preferably 1.5% or less by mass, more preferably 1.0% or less by mass, based on the total mass of the wire.

In the present embodiment, the $Al_2O_3$ content is the Al compound content in terms of $Al_2O_3$.

<C: Less than 0.015% by Mass>

The incorporation of C into the wire increases the amount of carbon in the weld metal to decrease the low-temperature toughness. For this reason, the C content based on the total mass of the wire is preferably minimized.

A C content of 0.015% or more by mass based on the total mass of the wire results in a decrease in the low-temperature toughness of the weld metal and an increase in the amount of spatter generated during welding. Accordingly, the C content is less than 0.015% by mass, preferably 0.012% or less by mass, more preferably 0.009% or less by mass, based on the total mass of the wire.

<Ti: 1.0% or Less by Mass>

Although Ti is not an essential component in the wire of the present embodiment, Ti is an element having a deoxidizing action. For this reason, Ti can be contained in the wire as an optional component.

A Ti content of more than 1.0% by mass based on the total mass of the wire results in an increase in the amount of carbon in the weld metal due to its effect as a strong deoxidizing agent, thereby decreasing the toughness of the weld metal.

Accordingly, the Ti content is 1.0% or less by mass, preferably 0.8% or less by mass, more preferably 0.6% or less by mass, based on the total mass of the wire.

The lower limit of the Ti content based on the total mass of the wire may be, but is not particularly limited to, 0% by mass, or 0.001% or more by mass.

In the present embodiment, the Ti content is the total amount of Ti contained in elemental Ti and Ti alloys.

<Mo: 2.0% or Less by Mass>

Although Mo is not an essential component in the wire of the present embodiment, Mo can be contained in the wire as an optional component for the purpose of improving the strength of the weld metal.

A Mo content of more than 2.0% by mass based on the total mass of the wire results in a deterioration in low-temperature toughness. Accordingly, the Mo content is 2.0% or less by mass, preferably 1.8% or less by mass, more preferably 1.6% or less by mass, based on the total mass of the wire.

The lower limit of the Mo content based on the total mass of the wire may be, but is not particularly limited to, 0% by mass, or 0.001% or more by mass.

<Cu: 0.5% or Less by Mass>

Although Cu is not an essential component in the wire of the present embodiment, Cu can be contained in the wire as an optional component for the purpose of stabilizing the austenite microstructure.

A Cu content of more than 0.5% by mass based on the total mass of the wire results in a deterioration in low-temperature toughness. Accordingly, the Cu content is 0.5% or less by mass, preferably 0.3% or less by mass, more preferably 0.1% or less by mass, based on the total mass of the wire.

The lower limit of the Cu content based on the total mass of the wire may be, but is not particularly limited to, 0% by mass, or 0.001% or more by mass.

<Al: 0.9% or Less by Mass>

Although Al is not an essential component in the wire of the present embodiment, Al is an element having a deoxidizing action. For this reason, Al can be contained in the wire as an optional component.

At an Al content of more than 0.9% by mass based on the total mass of the wire, the solidification microstructure of ferrite is changed from columnar crystals to equiaxed crystals, and the shape of the austenite to be subsequently generated is changed from the Widmanstätten structure to the granular shape, thereby deteriorating the toughness and the slag removability. Accordingly, the Al content is 0.9% or less by mass, preferably 0.6% or less by mass, more preferably 0.2% or less by mass, based on the total mass of the wire.

The lower limit of the Al content based on the total mass of the wire may be, but is not particularly limited to, 0% by mass, or 0.001% or more by mass.

In the present embodiment, the Al content is the total amount of Al contained in elemental Al and Al alloys.

<N: 0.040% or Less by Mass>

N is not an essential component in the wire of the present embodiment, but N is an element effective in improving the strength of the weld metal and reducing the surface tension to improve the bead wetting; thus, N can be contained in the wire as an optional component.

A N content of more than 0.040% by mass based on the total mass of the wire leads to insufficiently low surface tension of the molten metal to deteriorate the bead shape and the slag removability, and also leads to an increase of spatters. Accordingly, the N content is 0.040% or less by mass, preferably 0.030% or less by mass, more preferably 0.020% or less by mass, based on the total mass of the wire.

The lower limit of the N content based on the total mass of the wire may be, but is not particularly limited to, 0% by mass, or 0.001% or more by mass.

<F: 0.30% or Less by Mass>

Although F is not an essential component in the wire of the present embodiment, F is an element effective in increasing the viscosity of the molten slag to improve the fluidity and thereby improving the bead appearance and the bead shape; thus, F can be contained in the wire.

A F content of more than 0.30% by mass based on the total mass of the wire may result in the increase of porosity defects.

Accordingly, the F content is 0.30% or less by mass, preferably 0.25% or less by mass, more preferably 0.20% or less by mass, based on the total mass of the wire.

The lower limit of the F content based on the total mass of the wire may be, but is not particularly limited to, 0% by mass, or 0.001% or more by mass.

<θ Calculated from Mathematical Expression (I): 10.0 or More and 30.0 or Less>

In the present embodiment, the weld metal can be maintained at a predetermined ferrite content to provide desired strength and toughness by appropriately controlling the amount of each of the above elements contained and controlling θ calculated from the following mathematical expression (I) based on the amount of each alloying element contained in the wire.

When θ calculated from mathematical expression (I) is less than 10.0, the amount of ferrite is insufficient, thereby leading to insufficient strength of the weld metal. Accordingly, θ is 10.0 or more, preferably 12.0 or more, more preferably 24.0 or more.

When θ calculated from mathematical expression (I) is more than 30.0, the amount of ferrite is excessive, thereby deteriorating the low-temperature toughness to fail to obtain a desired Charpy impact value. Accordingly, θ is 30.0 or less, preferably 29.0 or less.

$$\theta = 4.1 \times \alpha - 3.2 \times \gamma - 32.3 \qquad \text{(I)}$$

where letting the Si content be [Si] in terms of percentage by mass based on the total mass of the wire, letting the Cr content be [Cr] in terms of percentage by mass based on the total mass of the wire, letting the Mo content be [Mo] in terms of percentage by mass based on the total mass of the wire, letting the Ti content be [Ti] in terms of percentage by mass based on the total mass of the wire, letting the C content be [C] in terms of percentage by mass based on the total mass of the wire, letting the N content be [N] in terms of percentage by mass based on the total mass of the wire, letting the Mn content be [Mn] in terms of percentage by mass based on the total mass of the wire, letting the Cu content be [Cu] in terms of percentage by mass based on the total mass of the wire, and letting the Ni content be [Ni] in terms of percentage by mass based on the total mass of the wire, $$\alpha = 0.02 \times [Si] + [Cr] + 1.20 \times [Mo] + 0.3 \times [Ti] + 0.30, \text{ and}$$

$$\gamma = 24 \times [C] + 28 \times [N] + 0.25 \times [Mn] + 0.5 \times [Cu] + 1.10 \times [Ni].$$

<Bi: 0.001% or More by Mass and 0.10% or Less by Mass>

The wire according to the present embodiment may further contain Bi.

Bi is a component effective in improving the slag removability. However, an excessively high Bi content of the wire results in segregation of Bi in the final solidification zone of the weld metal, thereby deteriorating the hot crack resistance of the weld metal.

In the case of incorporating Bi into the wire, a Bi content of 0.001% or more by mass based on the total mass of the wire results in the effect of improving the slag removability. Accordingly, the Bi content based on the total mass of the wire is preferably 0.001% or more by mass, more preferably 0.01% or more by mass.

When the Bi content is 0.10% or less by mass based on the total mass of the wire, a deterioration in the hot crack resistance of the weld metal can be inhibited. Accordingly, the Bi content is preferably 0.10% or less by mass, more preferably 0.08% or less by mass, based on the total mass of the wire.

In the present embodiment, the Bi content is the total amount of Bi contained in elemental Bi, Bi alloys, and Bi compounds.

<Remainder>

The wire according to the present embodiment contains 2.0% or less by mass of incidental impurities as the remainder of components other than the above. The remainder of the wire may contain, for example, Co, V, and W in an amount of 1.0% or less by mass each.

The wire according to the present embodiment preferably contains Fe, Cr, Ni, Si, Mn, Na and K, $TiO_2$, $ZrO_2$, $Al_2O_3$, C, Ti, Mo, Cu, Al, N, and F in a total amount of 90% or more by mass, more preferably 93% or more by mass, even more preferably 95% or more by mass, particularly preferably 98% or more by mass.

EXAMPLES

Hereinafter, the effects of the present invention will be specifically described with reference to inventive examples according to the present embodiment and comparative examples, but the present invention is not limited thereto.

Flux-cored wires having a diameter of 1.20 mm for gas-shielded arc welding were produced, these wires being adjusted to have various chemical component contents.

<Evaluation of Mechanical Properties>

Gas-shielded arc welding was performed with the produced flux-cored wires under the welding conditions, given in Table 1 below, for evaluation tests of mechanical properties. In this example, test plates of symbol 1.3 specified in JIS Z3111 were used. Two buttering layers were deposited on the groove surfaces thereof with a wire to be used. Then gas-shielded arc welding was performed to produce deposited metal test pieces. The mechanical properties of the deposited metal were measured in accordance with "Methods of tension and impact tests for deposited metal" specified in JIS Z 3111:2005. Type-A0 tensile test specimens were taken from the weld metal test pieces, and the tensile strength was evaluated by a tensile test. V-notch test specimens were taken, and the low-temperature toughness was evaluated by a Charpy impact test at −196° C.

Evaluation criteria for mechanical properties were as follows: Wires each having a tensile strength of 640 MPa or more and a Charpy impact value of 25 J or more at −196° C. was rated ○ (good). Among these, wires each having a tensile strength of 670 MPa or more were rated ◎ (excellent). Wires each having a tensile strength of less than 640 MPa or a Charpy impact value of less than 25 J at −196° C. were rated x (poor).

[Evaluation of Usability in Welding]

To evaluate usability in welding, gas-shielded arc welding was performed with the flux-cored wires under the welding conditions, given in Table 1 below, for evaluation test of usability in welding.

In the present embodiment, two welding positions, horizontal fillet welding and vertical-up fillet welding, were used.

<Evaluation of Bead Shape>

The bead shape was evaluated in accordance with AWS A5.22 paragraph 15.2.2.

The evaluation criteria of the bead shape were as follows: A bead shape that met the determination criteria of the AWS standard was rated ○ (good). A bead shape that did not meet the determination criteria and that was a convex shape was rated x (poor).

<Evaluation of Slag Removability>

The slag removability was evaluated by applying a light impact with a hammer to the weld joint and checking the removal of the slag.

The evaluation criteria for slag removability were as follows: Joints in which slag was spontaneously removed or slag was removed by application of a light impact were rated ○ (good). Joints in which slag was stuck and was not removed from the surfaces of the beads were rated x (poor).

Tables 2 and 3 below present the chemical compositions and the calculated values based on specific components of the produced wires, and Table 4 below presents the evaluation results.

In Table 2, "Na+K" represents the total of the Na content and the K content of the wire. In the column of "Calculated value based on specific component" in Table 3, $$\alpha=0.02\times[Si]+[Cr]+1.20\times[Mo]+0.3\times[Ti]+0.30,$$

$$\gamma=24\times[C]+28\times[N]+0.25\times[Mn]+0.5\times[Cu]+1.10\times[Ni],$$

and θ is a value calculated from the following mathematical expression (I):

$$\theta=4.1\times\alpha-3.2\times\gamma-32.3 \tag{I}$$

where, in the above expression, [Si] is a value of the Si content in terms of percentage by mass based on the total mass of the wire, [Cr] is a value of the Cr content in terms of percentage by mass based on the total mass of the wire, [Mo] is a value of the Mo content in terms of percentage by mass based on the total mass of the wire, [Ti] is a value of the Ti content in terms of percentage by mass based on the total mass of the wire, [C] is a value of the C content in terms of percentage by mass based on the total mass of the wire, [N] is a value of the N content in terms of percentage by mass based on the total mass of the wire, [Mn] is a value of the Mn content in terms of percentage by mass based on the total mass of the wire, [Cu] is a value of the Cu content in terms of percentage by mass based on the total mass of the wire, and [Ni] is a value of the Ni content in terms of percentage by mass based on the total mass of the wire.

TABLE 1

| | Welding conditions | |
|---|---|---|
| | For evaluation test of mechanical properties | For evaluation test of usability in welding |
| Steel type of base material | ASTM A36, rolled steel plate | SUS304, steel plate |
| Polarity | DC-EP | DC-EP |
| Welding position | flat | horizontal fillet, vertical-up fillet |
| Welding current | 200 A | horizontal fillet: 200 A vertical-up fillet: 150 A |
| Arc voltage | 27 V | horizontal fillet: 27 V vertical-up fillet: 25 V |
| Type and flow rate of shielding gas | 100% CO₂ gas, 25 L/min | 100% CO₂ gas, 25 L/min |
| Interpass temperature | 150° C. or lower | — |
| Build-up sequence | 6 layers, 12 passes | 1 layer, 1 pass |

TABLE 2

| | Chemical composition of flux-cored wire (% by mass) | | | | | | | | | | | | | | | |
|---|---|---|---|---|---|---|---|---|---|---|---|---|---|---|---|---|
| Wire No. | | Fe | Cr | Ni | Si | Mn | Na + K | TiO₂ | ZrO₂ | Al₂O₃ | C | Ti | Mo | Cu | Al | N | F |
| Inventive | 1 | 57 | 19.2 | 8.38 | 1.23 | 1.56 | 0.62 | 7.80 | 1.83 | 0.92 | 0.006 | 0.50 | 0.03 | 0.03 | 0.01 | 0.01 | 0.05 |
| example | 2 | 54 | 21.3 | 9.41 | 1.23 | 1.03 | 0.61 | 7.80 | 1.83 | 0.92 | 0.005 | 0.50 | 0.03 | 0.03 | 0.01 | 0.01 | 0.05 |
| | 3 | 54 | 22.1 | 9.41 | 1.23 | 1.03 | 0.61 | 7.80 | 1.83 | 0.92 | 0.005 | 0.50 | 0.03 | 0.03 | 0.01 | 0.01 | 0.05 |
| | 4 | 53 | 23.0 | 9.41 | 1.23 | 1.03 | 0.61 | 7.80 | 1.83 | 0.92 | 0.005 | 0.50 | 0.03 | 0.03 | 0.01 | 0.01 | 0.05 |
| | 5 | 54 | 21.3 | 9.41 | 1.23 | 1.56 | 0.61 | 7.80 | 1.83 | 0.92 | 0.005 | 0.50 | 0.03 | 0.03 | 0.01 | 0.01 | 0.05 |
| | 6 | 53 | 22.1 | 9.41 | 1.23 | 1.56 | 0.61 | 7.80 | 1.83 | 0.92 | 0.005 | 0.50 | 0.03 | 0.03 | 0.01 | 0.01 | 0.05 |
| | 7 | 52 | 22.9 | 9.41 | 1.18 | 1.56 | 0.61 | 7.80 | 1.83 | 0.92 | 0.005 | 0.50 | 0.03 | 0.03 | 0.01 | 0.01 | 0.05 |
| | 8 | 57 | 20.2 | 7.29 | 1.23 | 1.56 | 0.61 | 7.80 | 1.83 | 0.92 | 0.005 | 0.45 | 0.03 | 0.03 | 0.01 | 0.01 | 0.05 |
| | 9 | 57 | 20.2 | 7.29 | 1.23 | 1.56 | 0.61 | 7.80 | 1.83 | 0.92 | 0.005 | 0.45 | 0.03 | 0.03 | 0.06 | 0.01 | 0.05 |
| | 10 | 59 | 17.5 | 7.29 | 1.23 | 2.23 | 0.61 | 7.80 | 1.83 | 0.92 | 0.005 | 0.45 | 0.03 | 0.03 | 0.01 | 0.01 | 0.05 |
| | 11 | 56 | 19.3 | 8.28 | 0.97 | 1.56 | 0.62 | 7.80 | 1.83 | 0.92 | 0.006 | 0.67 | 1.36 | 0.03 | 0.005 | 0.01 | 0.05 |
| Comparative | 12 | 52 | 23.4 | 9.41 | 1.18 | 1.03 | 0.62 | 7.80 | 1.83 | 0.92 | 0.006 | 0.50 | 0.03 | 0.03 | 0.01 | 0.01 | 0.05 |
| example | 13 | 41 | 29.3 | 14.93 | 1.13 | 1.03 | 0.62 | 7.87 | 1.85 | 0.93 | 0.033 | 0.61 | 0.03 | 0.03 | 0.01 | 0.02 | 0.05 |
| | 14 | 56 | 22.0 | 9.35 | 0.99 | 1.04 | 0.50 | 7.09 | 2.13 | 0.04 | 0.006 | 0.51 | 0.03 | 0.03 | 0.01 | 0.01 | 0.18 |
| | 15 | 55 | 21.8 | 9.30 | 0.98 | 1.56 | 0.50 | 7.05 | 2.12 | 0.04 | 0.005 | 0.50 | 0.03 | 0.03 | 0.01 | 0.01 | 0.18 |
| | 16 | 54 | 22.9 | 9.35 | 0.99 | 1.57 | 0.50 | 7.09 | 2.13 | 0.04 | 0.006 | 0.51 | 0.03 | 0.03 | 0.01 | 0.01 | 0.18 |

TABLE 2-continued

| | | | | | | | Chemical composition of flux-cored wire (% by mass) | | | | | | | | | |
|---|---|---|---|---|---|---|---|---|---|---|---|---|---|---|---|---|
| Wire No. | Fe | Cr | Ni | Si | Mn | Na + K | TiO$_2$ | ZrO$_2$ | Al$_2$O$_3$ | C | Ti | Mo | Cu | Al | N | F |
| 17 | 54 | 21.4 | 8.40 | 1.33 | 1.03 | 0.61 | 7.80 | 1.83 | 0.92 | 0.006 | 0.56 | 0.03 | 0.03 | 1.07 | 0.05 | 0.05 |
| 18 | 54 | 21.4 | 8.80 | 1.33 | 1.03 | 0.62 | 7.80 | 1.83 | 0.92 | 0.006 | 0.27 | 0.03 | 0.03 | 1.06 | 0.05 | 0.05 |
| 19 | 53 | 21.4 | 9.23 | 1.33 | 1.03 | 0.62 | 7.80 | 1.83 | 0.92 | 0.006 | 0.42 | 0.03 | 0.03 | 1.06 | 0.05 | 0.05 |
| 20 | 52 | 21.8 | 9.56 | 1.23 | 1.55 | 0.61 | 7.79 | 1.83 | 0.92 | 0.006 | 0.37 | 0.03 | 0.03 | 1.06 | 0.01 | 0.05 |
| 21 | 55 | 18.3 | 7.29 | 0.99 | 3.02 | 0.62 | 7.80 | 1.83 | 0.92 | 0.006 | 0.67 | 2.69 | 0.03 | 0.01 | 0.01 | 0.05 |

TABLE 3

| | | Chemical composition of flux-cored wire (% by mass) | | | Calculated value based on specific component | | |
|---|---|---|---|---|---|---|---|
| Wire No. | | Bi | P | S | α | γ | θ |
| Inventive example | 1 | 0.05 | 0.015 | 0.003 | 19.7 | 10.0 | 16.5 |
| | 2 | 0.05 | 0.014 | 0.003 | 21.8 | 11.0 | 21.9 |
| | 3 | 0.05 | 0.014 | 0.003 | 22.6 | 11.0 | 25.2 |
| | 4 | 0.05 | 0.014 | 0.003 | 23.5 | 11.0 | 28.9 |
| | 5 | 0.05 | 0.014 | 0.003 | 21.8 | 11.2 | 21.2 |
| | 6 | 0.05 | 0.014 | 0.003 | 22.6 | 11.2 | 24.5 |
| | 7 | 0.05 | 0.014 | 0.003 | 23.4 | 11.2 | 27.8 |
| | 8 | 0.05 | 0.015 | 0.003 | 20.7 | 8.8 | 24.3 |
| | 9 | 0.05 | 0.015 | 0.003 | 20.7 | 8.8 | 24.3 |
| | 10 | 0.05 | 0.015 | 0.003 | 18.0 | 9.0 | 12.7 |
| | 11 | 0.05 | 0.012 | 0.004 | 21.5 | 9.9 | 24.2 |
| Comparative example | 12 | 0.05 | 0.015 | 0.003 | 23.9 | 11.0 | 30.5 |
| | 13 | 0.05 | 0.012 | 0.004 | 29.8 | 18.0 | 32.3 |
| | 14 | 0.05 | 0.015 | 0.004 | 22.5 | 11.0 | 24.8 |
| | 15 | 0.05 | 0.015 | 0.004 | 22.3 | 11.0 | 23.9 |
| | 16 | 0.05 | 0.015 | 0.004 | 23.4 | 11.1 | 28.1 |
| | 17 | 0.05 | 0.014 | 0.004 | 21.9 | 11.1 | 22.0 |
| | 18 | 0.05 | 0.014 | 0.004 | 21.8 | 11.5 | 20.3 |
| | 19 | 0.05 | 0.014 | 0.004 | 21.9 | 12.0 | 19.1 |
| | 20 | 0.05 | 0.014 | 0.003 | 22.3 | 11.3 | 23.0 |
| | 21 | 0.05 | 0.012 | 0.004 | 22.0 | 9.2 | 28.4 |

As presented in Tables 2 to 4 above, in wire Nos. 1 to 11, which are inventive examples, the components of each wire and θ obtained from expression (1) were within the ranges of the present invention; thus, the wires were excellent in mechanical properties and usability in welding.

In wire No. 12, which is a comparative example, the amount of each component contained was within the range of the present invention. However, θ calculated from expression (I) was more than the upper limit of the range of the present invention, thus deteriorating the low-temperature toughness.

In wire No. 13, which is a comparative example, the Cr, Ni, and C contents of the wire were more than the upper limits of the ranges of the present invention, and θ was more than the upper limit of the range of the present invention; thus, the low-temperature toughness was significantly deteriorated.

In wire Nos. 14 to 16, which are comparative examples, the Al$_2$O$_3$ content of each wire was less than the lower limit of the range of the present invention; thus, the bead shape and the slag removability in the vertical-up fillet welding were poor, and the slag removability in the horizontal fillet welding was also poor. In wire No. 16, the low-temperature toughness was also deteriorated.

In wire Nos. 17 to 20, which are comparative examples, the Al content of each wire was more than the upper limit of

TABLE 4

| | | Evaluation result | | | | | | |
|---|---|---|---|---|---|---|---|---|
| | | Mechanical properties | | | Usability in welding | | | |
| | | | Low- | | Bead shape | | Slag removability | |
| Wire No. | | Tensile strength (MPa) | temperature toughness vE - 196° C. (J) | Evaluation of mechanical properties | Horizontal fillet welding | Vertical-up fillet welding | Horizontal fillet welding | Vertical-up fillet welding |
| Inventive example | 1 | 645 | 41 | ○ | ○ | ○ | ○ | ○ |
| | 2 | 645 | 38 | ○ | ○ | ○ | ○ | ○ |
| | 3 | 668 | 32 | ○ | ○ | ○ | ○ | ○ |
| | 4 | 692 | 25 | ◎ | ○ | ○ | ○ | ○ |
| | 5 | 655 | 32 | ○ | ○ | ○ | ○ | ○ |
| | 6 | 682 | 29 | ◎ | ○ | ○ | ○ | ○ |
| | 7 | 685 | 28 | ◎ | ○ | ○ | ○ | ○ |
| | 8 | 679 | 39 | ◎ | ○ | ○ | ○ | ○ |
| | 9 | 690 | 31 | ◎ | ○ | ○ | ○ | ○ |
| | 10 | 667 | 41 | ○ | ○ | ○ | ○ | ○ |
| | 11 | 694 | 35 | ◎ | ○ | ○ | ○ | ○ |
| Comparative example | 12 | 702 | 23 | X | ○ | ○ | ○ | ○ |
| | 13 | 679 | 3 | X | ○ | ○ | ○ | ○ |
| | 14 | 660 | 35 | ○ | ○ | X | X | X |
| | 15 | 663 | 35 | ○ | ○ | X | X | X |
| | 16 | 688 | 22 | X | ○ | X | X | X |
| | 17 | 724 | 7 | X | ○ | X | X | X |
| | 18 | 682 | 18 | X | ○ | X | X | X |
| | 19 | 683 | 18 | X | ○ | X | X | X |
| | 20 | 685 | 21 | X | ○ | X | X | X |
| | 21 | 740 | 15 | X | ○ | ○ | ○ | ○ | the range of the present invention; thus, the bead shape and the slag removability in the vertical-up fillet welding were poor, and the slag removability in the horizontal fillet welding was also poor. In each of the wires, the low-temperature toughness was also deteriorated.

In wire No. 21, which is a comparative example, the Mo content of the wire was more than the upper limit of the range of the present invention; thus, the low-temperature toughness was deteriorated.

FIG. 1 is a graph illustrating the relationship between the tensile strength and θ in inventive examples and comparative examples, the vertical axis representing the tensile strength (MPa), and the horizontal axis representing θ. A broken line depicted in FIG. 1 is an approximate straight line obtained by linearly approximating points.

FIG. 1 revealed that the tensile strength decreases as the value of θ calculated from mathematical expression (I) decreases.

As described in detail above, the use of the flux-cored wire for gas-shielded arc welding according to the present embodiment made it possible to obtain a weld metal having good bead shape, good slag removability, and an excellent balance between the tensile strength and the low-temperature toughness.

Although various embodiments have been described above with reference to the drawings, it goes without saying that the present invention is not limited to such embodiments. It will be apparent to those skilled in the art that various changes and modifications can be made within the scope of the claims, and it is understood that the changes and modifications are included within the technical scope of the present invention. The elements in the embodiments may be freely combined without departing from the gist of the invention.

This application is based on Japanese Patent Application No. 2020-210799 filed Dec. 18, 2020, the contents of which are incorporated herein by reference.

The invention claimed is:

1. A flux-cored wire for gas-shielded arc welding, the flux-cored wire including a sheath filled with a flux, comprising, based on a total mass of the wire:

Fe: 40% or more by mass and 70% or less by mass;
Cr: 15.0% or more by mass and 25.0% or less by mass;

Ni: 5.0% or more by mass and 11.0% or less by mass;
Si: 0.5% or more by mass and 3.0% or less by mass;
Mn: 0.5% or more by mass and 5.0% or less by mass;
Na and K in total: 0.05% or more by mass and 1.0% or less by mass;
$TiO_2$: 3.0% or more by mass and 9.0% or less by mass;
$ZrO_2$: more than 1.0% by mass and 4.0% or less by mass;
$Al_2O_3$: 0.3% or more by mass and 2.0% or less by mass;
C: less than 0.015% by mass;
Ti: 1.0% or less by mass;
Mo: 2.0% or less by mass;
Cu: 0.5% or less by mass;
Al: 0.9% or less by mass;
N: 0.040% or less by mass; and
F: 0.30% or less by mass, wherein θ calculated from the following mathematical expression is 10.0 or more and 30.0 or less, $$\theta = 4.1 \times \alpha - 3.2 \times \gamma - 32.3 \tag{I}$$

where letting a Si content be [Si] in terms of percentage by mass based on the total mass of the wire, letting a Cr content be [Cr] in terms of percentage by mass based on the total mass of the wire, letting a Mo content be [Mo] in terms of percentage by mass based on the total mass of the wire, letting a Ti content be [Ti] in terms of percentage by mass based on the total mass of the wire, letting a C content be [C] in terms of percentage by mass based on the total mass of the wire, letting a N content be [N] in terms of percentage by mass based on the total mass of the wire, letting a Mn content be [Mn] in terms of percentage by mass based on the total mass of the wire, letting a Cu content be [Cu] in terms of percentage by mass based on the total mass of the wire, and letting a Ni content be [Ni] in terms of percentage by mass based on the total mass of the wire, $$\alpha = 0.02 \times [Si] + [Cr] + 1.20 \times [Mo] + 0.3 \times [Ti] + 0.30, \text{ and}$$

$$\gamma = 24 \times [C] + 28 \times [N] + 0.25 \times [Mn] + 0.5 \times [Cu] + 1.10 \times [Ni].$$

2. The flux-cored wire according to claim 1, further comprising, based on the total mass of the wire:
Bi: 0.001% or more by mass and 0.10% or less by mass.

* * * * *